United States Patent [19]

Bonacorsi

[11] 4,427,876
[45] Jan. 24, 1984

[54] GRAVITY SWITCH

[75] Inventor: Robert W. Bonacorsi, North Wales, Pa.

[73] Assignee: Proctor-Silex, Inc., King of Prussia, Pa.

[21] Appl. No.: 309,299

[22] Filed: Oct. 7, 1981

[51] Int. Cl.³ .................... A47J 37/08; H01H 37/52; H05B 1/02
[52] U.S. Cl. .................................. 219/413; 99/328; 219/494; 219/412; 200/DIG. 18; 337/3; 337/1
[58] Field of Search ............... 219/413, 412, 414, 391, 219/408, 490, 491, 494, 335, 339, 395, 486; 337/1, 3; 200/247, 248, DIG. 18, 52 A, 85 R, 61.83; 99/328, 333, 329 R

[56] References Cited

U.S. PATENT DOCUMENTS

| 1,665,735 | 4/1928 | Forbes | 99/328 |
| 3,119,000 | 1/1964 | Loch | 219/494 |
| 3,684,861 | 8/1972 | DeRemer | 219/413 |

FOREIGN PATENT DOCUMENTS

808775 3/1969 Canada ................ 219/494

Primary Examiner—B. A. Reynolds
Assistant Examiner—Teresa J. Walberg
Attorney, Agent, or Firm—Porter, Wright, Morris & Arthur

[57] ABSTRACT

A gravity switch for automatic control of an operative cycle in an appliance, such as a toasting cycle in a toaster oven or the like, includes an imbalanced weight member interposed between a displaceable member that moves in accordance to operation of the cycle and mechanical component parts operative between an OFF position and an ON position. During ON cycle operation, the imbalanced weight member is directly supported against the pull of gravity by the displaceable member. When the cycle operation reaches completion, the displaceable member is sufficiently moved so as to cause the release of the imbalanced weight member which is then free to move under the influence of gravity. This gravitational action initiates an interaction among the mechanical component parts resulting in quick return to the OFF position causing the cycle operation to rapidly terminate.

17 Claims, 7 Drawing Figures

_FIG 6_

_FIG 7_

GRAVITY SWITCH

BACKGROUND OF THE INVENTION

Field of the Invention

The present invention relates to switches and, more particularly to a mechanical type switch operable by gravity for control of a cycle operation of an appliance, such as the toasting cycle of a toaster over or toaster, the brewing cycle of a coffee maker, the mixing cycle of a blender or the like.

A convenient aspect concerning household appliances is that they are usually provided with a device or switch that functions to automatically control their cycle operation. Automatic cycle control switches are available in many varied and different arrangements of component parts that successfully function, basically, in a manner to assure consistant proper cycle operation of the appliance without requiring the special attention of the user and, usually in accordance to a desired selectable setting of a control feature. For example, generally, in toaster ovens there is usually employed a switch that serves to automatically terminate the toasting cycle when, e.g., a slice of bread is properly browned to avoid over-toasting of the bread.

Heretofore automatic cycle "shut-off" switches used in appliances include disadvantages which are directly related to their overall complexity. For example, many switches include the disadvantage of being made from a relatively large number of component parts which makes for a bulky mechanism that requires a relatively large area of space for assembly within the appliance. A complex switch mechanism contributes towards increased cost and weight of the appliance. In addition, these complex switches are difficult to service when in need of repair. Some switches are of the electro-mechanical type which often employ the services of a solenoid that is pulse actuated in order to control cycle operation. Solenoids have the disadvantage in that they are becoming increasingly expensive to manufacture or purchase. Solenoids also require electrical power to function which effectively draws or takes away power from the appliance. Accordingly, there is a real need to improve upon the design structure of appliance control switches to avoid the above-mentioned disadvantages.

SUMMARY OF THE INVENTION

In accordance with the teachings of the present invention there is provided a simple mechanical switch mechanism built from a minimum number of component parts that reliably operate to control a cycle operation of an appliance. The present invention concerns a gravity switch including an imbalanced weight member operable by the pull of gravity for initiating an interaction among component parts of the gravity switch. The component parts include, a selector lever coupled to a locking lever, a spring latch cooperable with the locking lever, and a pivot arm actuatable in response to gravitational movement of the imbalanced weight member.

The present gravity switch is shown and described embodied in a toaster oven for controlling the toasting cycle operation. The toaster oven is equipped with a rod member that is displaceable, in conjunction with toasting cycle operation, between a relaxed location and a displaced discrete location. The imbalanced weight member is interposed between the rod member and said component parts.

Generally, the operative sequence of the gravity switch includes, selectively moving the selector lever from an OFF position to an ON position to effectively initiate the toasting cycle operation. Movement of the selector lever to the ON position causes the locking lever to become latched by the spring latch for holding both of said levers of the gravity switch in the ON position. During cycle operation, the imbalanced weight member is supported against the pull of gravity by being engaged with the rod member. The pivot arm is urged into abutment with a face surface of the supported imbalanced weight member. Upon the rod member reaching the discrete location, corresponding to completion of the cycle operation, the imbalanced weight member is released from engagement therewith causing the imbalanced weight member to pivot under the influence of gravity. This gravitation action of the imbalanced weight member initiates an interaction among the component parts including release of the pivot arm from abutment with the face surface of the imbalanced weight member. Pivot arm actuation causes the spring latch to be released from latch engagement with the locking lever. A spring is connected to the locking lever under tension sufficient to return the component parts including the imbalanced weight member to the OFF position. Return of the gravity switch to the OFF position effectively terminates the toasting cycle operation.

Accordingly, it is an object of the present invention to provide an improved mechanical switch for controlling cycle operation of an appliance.

Another object of the present invention is to provide a simple switch constructed from few parts that interact in a highly reliable operative fashion.

Still another object of the present invention is to provide a switch for controlling cycle operation of an electrically powered appliance wherein the switch is operable from a power source other than the electrical power serving the appliance.

Another object of the present invention is to provide a switch which is operatively powered from the pull of gravity.

Still another object of the present invention is to provide a gravity switch that is relatively easy and inexpensive to manufacture and assemble.

DESCRIPTION OF THE PREFERRED EMBODIMENT

In FIGS. 1–4, there is shown a gravity switch, generally indicated by reference numeral 10, built in accordance to the teachings of the present invention. Gravity switch 10 is preferably embodied for use in conjunction with an appliance. Such as an electrically operated toaster oven 12, illustrated in FIG. 1. The purpose of the present gravity switch 10 is to provide a cycle operation controller that functions in an appliance to automatically terminate, e.g., a toasting cycle. This feature assures consistant proper browning of, say, a slice of bread or other food artical one may wish to toast according to a selectable setting without requiring operator attention.

Figure 1:
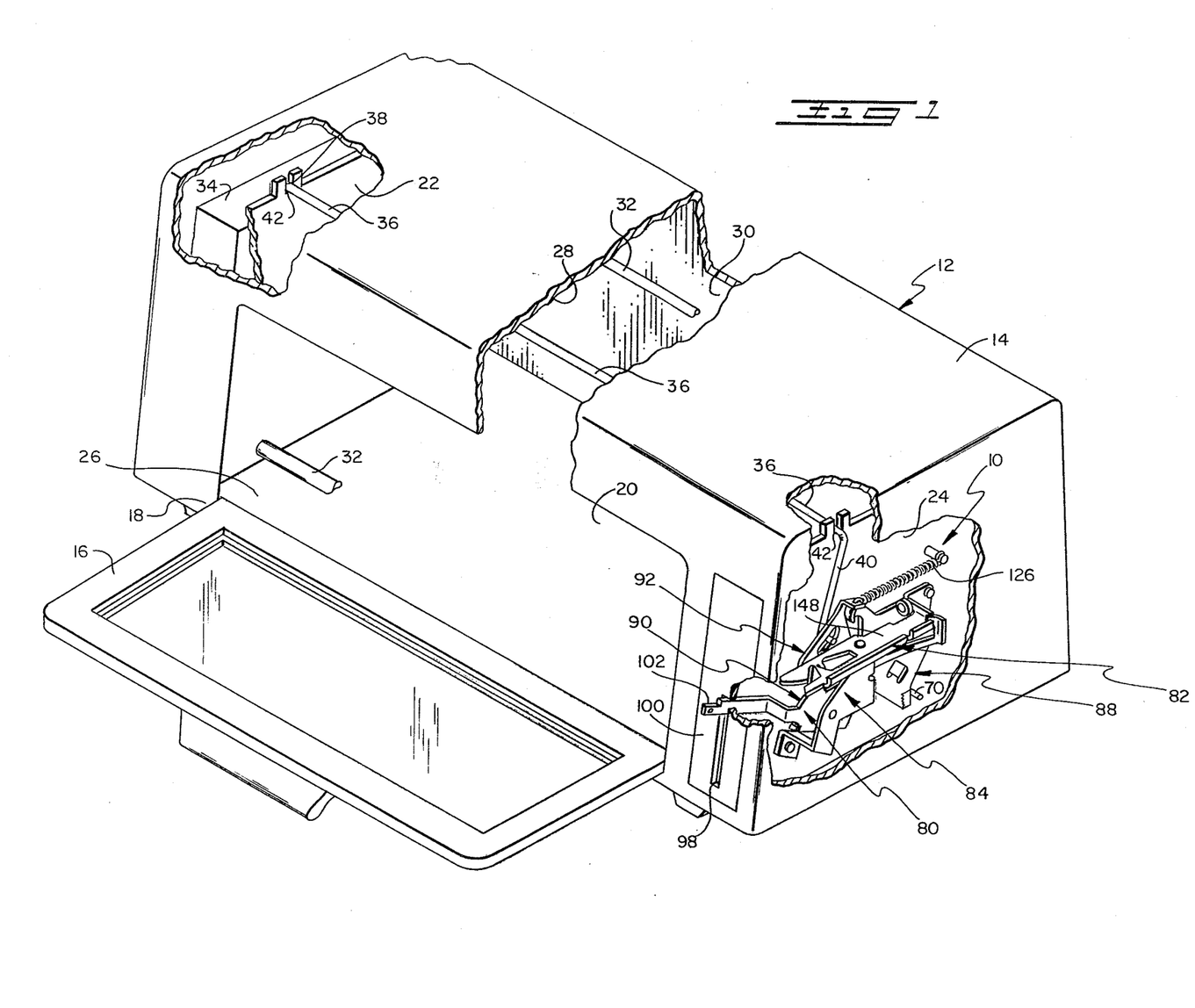
FIG. 1 is a front perspective view of a toaster oven appliance, partially in section, embodying a gravity switch built in accordance with the teachings of the present invention.

As shown in FIG. 1, toaster oven 12, generally, includes a rectangularly shaped housing 14 having a pivotable front door 16 hinged to a base 18 so as to provide access into an oven chamber 20. Left and right side walls 22,24 and bottom plate 26 are fixed to top and back walls 28,30 of housing 14 to collectively define oven chamber 20. A plurality of heating elements 32 are supported in a known fashion extending through side walls 22,24 along bottom plate 26 and top wall 30 traversing oven chamber 20. A suitable known electrical circuitry, generally represented by box 34 located near left side wall 22 external from oven chamber 20, is electrically connected to heating elements 32. Circuitry 34 contains a known electrical arrangement of component parts including an electrical switch (not shown) that is operable for selectively controlling the supply of current flow to heating elements 32. Normally, the electrical switch in circuitry 34 is open to effectively prevent current flow from reaching heating elements 32, as is occuring in the arrnagement of parts in FIG. 1. Current flow is allowed to pass through heating elements 32 when the electrical switch is closed, e.g., by a mechanical motion, such as, pivotal motion from a connected pivot bail 36. As is usual, continuous flow of current through heating elements 32 causes the temperature within oven chamber 20 to rise to a selected degree.

Pivot bail 36 is an elongated member having left and right end arms 38, 40 pivotally seated on corresponding recess 42 fabricated on each one of the side walls 22, 24. End arm 38 is coupled, in a suitable known fashion, not shown, to effect actuation of the electrical switch when pivot bail 36 is pivoted in a clockwise direction from the illustrated rest position of FIGS. 1–3. The other end arm 40 extends downwardly from its recess 42, along side wall 24 external from oven chamber 20, and is coupled to gravity switch 10 in a manner discussed below.

Figure 2:
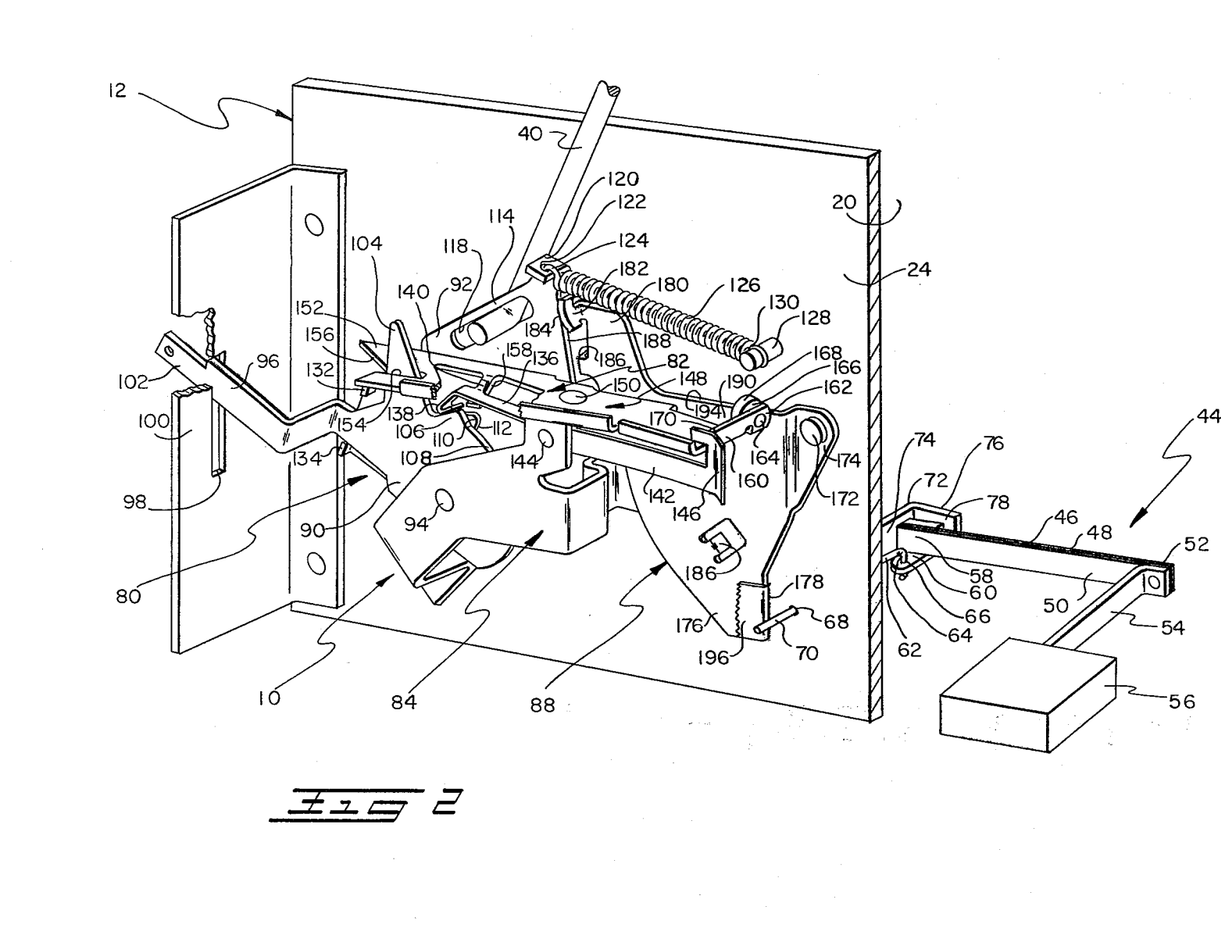
FIG. 2 is an enlarged rear perspective view showing in detail, component parts of the present gravity switch assembled on the right portion of the toaster oven and arranged in an OFF position.

Referring to FIG. 2, there is shown a partial rear perspective view of toaster oven 12 illustrating gravity switch 10 in working relation to a thermosensitive device 44 which is operatively responsive to temperature changes within oven chamber 20. Preferably, thermosensative device 44 is a bi-metal strip 46 built from two different metal material blades 48, 50, etch welded together in a face-to-face relation. One end 52 of strip 46 is secured, e.g., by a weld, to an arm 54 which extends from a selectively adjustable mechanism, represented by a box 56 located near right side wall 24. The other end 58 of strip 46 is free. The two blades 48, 50 of strip 46 are of dissimilar metals each having a different coefficient of linear expansion constant which is a determined value expression serving to enable prior calculation of dimensional changes that occur within a particular metal owing to temperature variations causing the metal to deform. In this regard, the metal material selected for blade 48, which is located furthest from side wall 24, has a coefficient of linear expansion constant less than the metal material selected to make blade 50. As an operative example, blade 48 may be made from steel and blade 50 may be made from copper to provide a proper deformation relation between the two blades 48 and 50. The exact coefficient of linear expansion constant for each blade 48, 50 is omitted because only the combined working manner is necessary to understand the functioning operation of thermosensative device 44. Accordingly, strip 46 will react to environmental variations in temperature within oven chamber 20 in a manner whereby temperatures exceeding a normal room temperature of approximately 70° Fahrenheit (used as a bases in establishing a relaxed position for strip 46) subject strip 46 to stress causing a deformation thereof resulting in free end 58 moving away from side wall 24. Strip 46 is shown in the normal relaxed position in FIG. 2.

Figure 5:
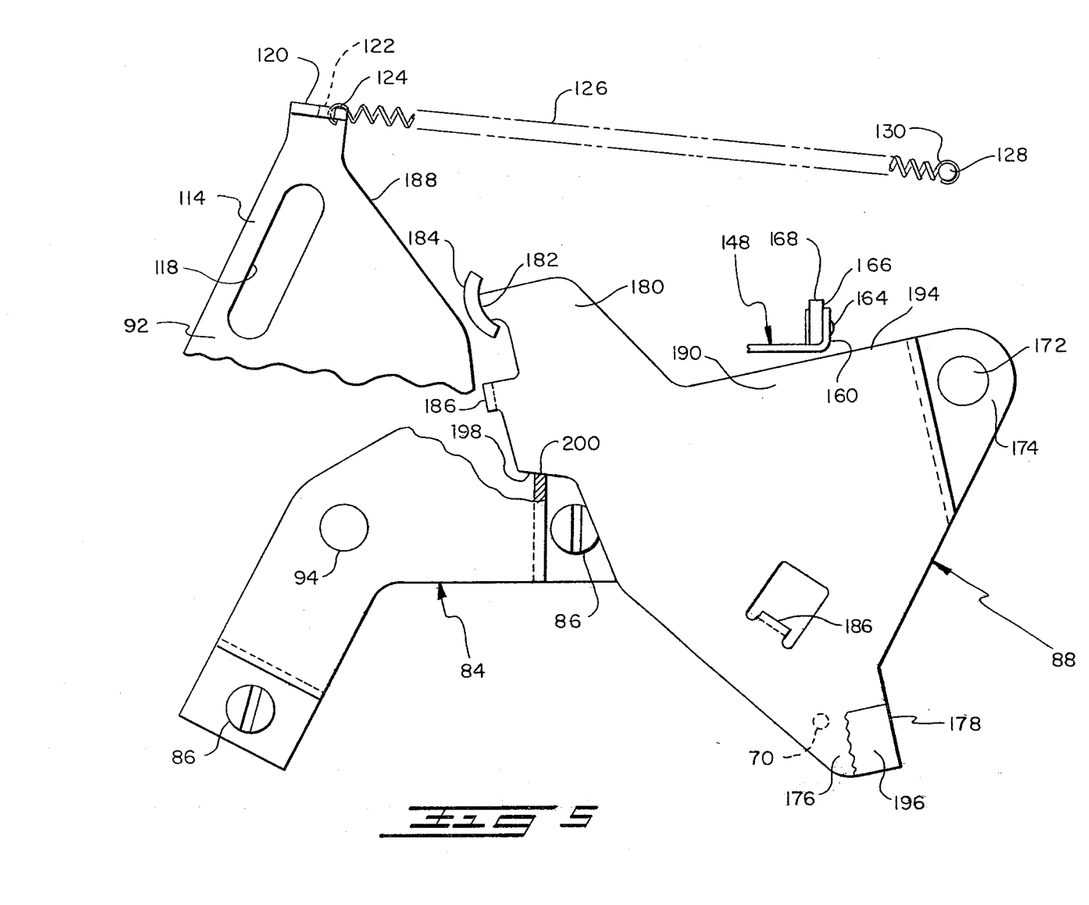
FIG. 5 is a partial view similar to FIG. 4 showing the imbalanced weight member in an actuated position.

A tab 60 is fixed by a weld on free end 58. An extension rod 62 has a formed end 64 freely received through an aperture 66 through tab 60. Rod 62 extends from end 64 in a direction towards side wall 24 whereat it freely passes through a support guide hole 68 through side wall 24. Rod 62 terminates at a free end 70 located beyond side wall 24 external from oven chamber 20. FIG. 2 illustrates free end 70 in a relaxed relation to gravity switch 10. The relaxed position of strip 46 in FIG. 2 may be adjusted laterally by means of adjustable mechanism in box 56 in accordance with operatively attached selectable setting device (not shown). It can be easily seen that rod 62 will move laterally from the relaxed position of FIG. 2 towards a displaced position in FIG. 5 in response to movement of free end 58 of strip 46 away from side wall 24 caused by a rise in temperature within oven chamber 20 from the normal room temperature.

An L-shaped bracket 72 is secured (by fasteners not shown) on side wall 24. An arm 74 of bracket 72 projects into oven chamber 20 to terminate at a formed ear 76 located beyond free end 58 of strip 46. Formed ear 76 serves as a stop limit for restricting extreme displacement of rod 62 into oven chamber 20. The normal air gap relation 78 between free end 58 and formed ear 64 is dimensioned so as to not allow end 70 of rod 62 to become dislodged from hole 68 when free end 70 is moved to its limit against formed ear 76.

Figure 3:
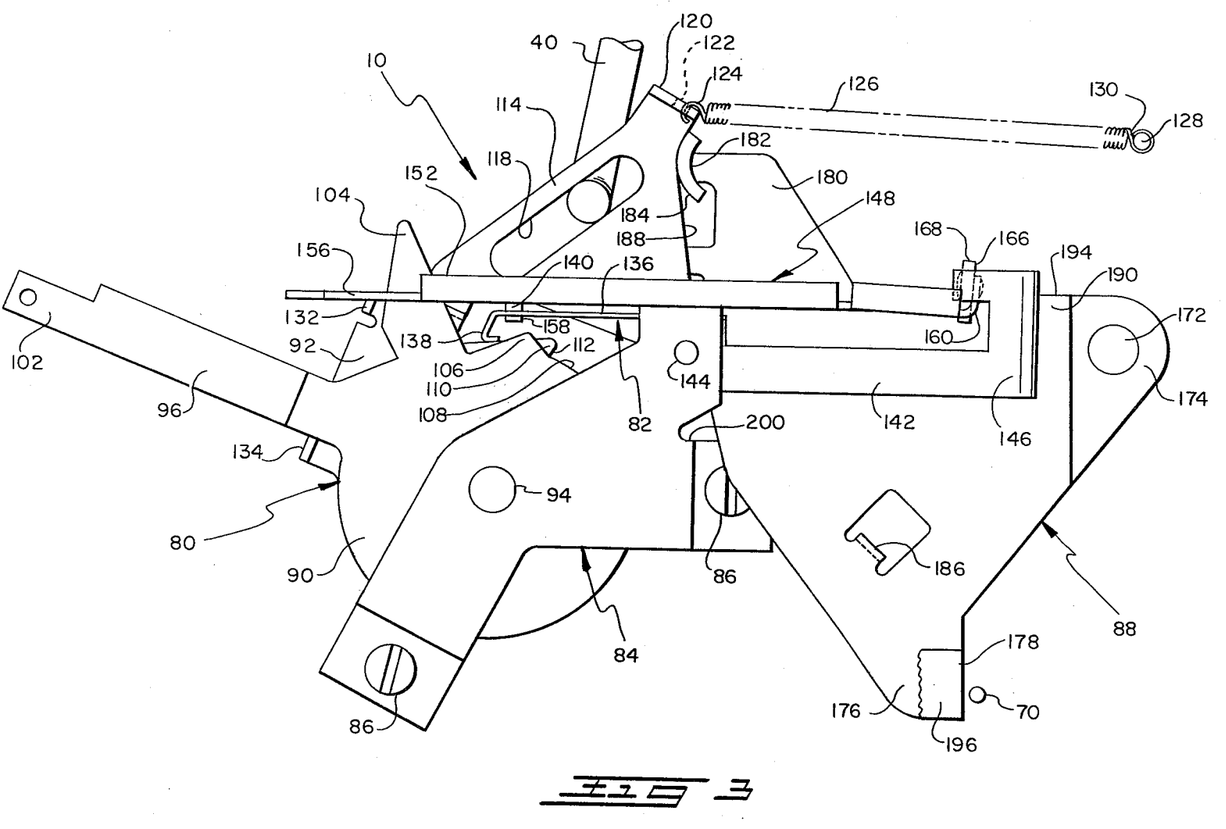
FIG. 3 is a further enlarged right side elevational view showing in greater detail the arrangement of component parts according to FIG. 2.
Figure 4:
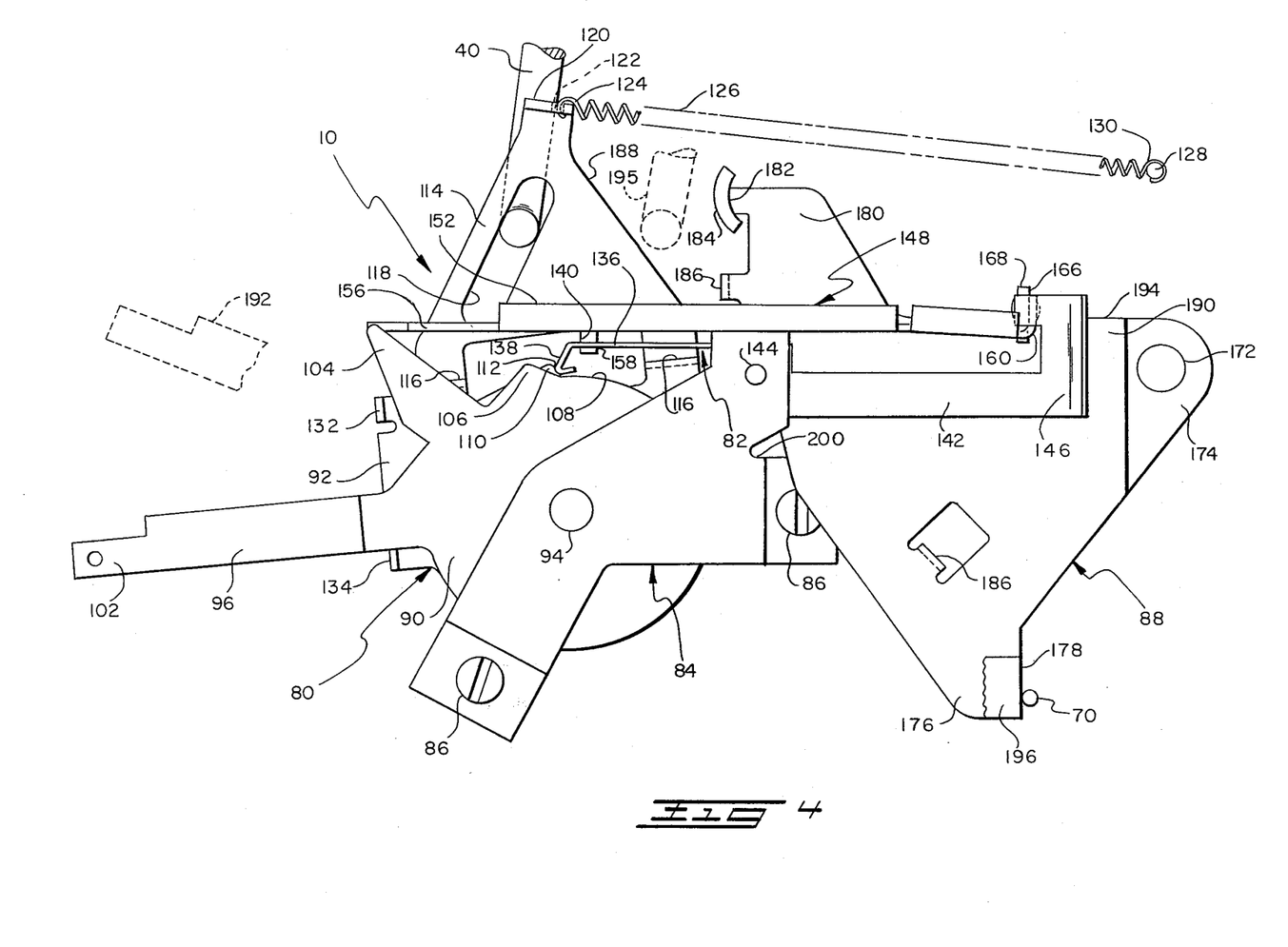
FIG. 4 is a view similar to FIG. 3 showing component parts of the present gravity switch arranged in an ON position with an imbalanced weight member in a supported position.

As most clearly shown in FIGS. 2–4, gravity switch 10 comprises, generally, a selector portion 80 and a releasable latching device 82, both being mounted on a bracket 84 which, in turn, is firmly attached, e.g., by screws 66 (FIGS. 3 and 4) on side wall 24 external from oven chamber 20. An imbalanced weight member 88 is interposed between selector portion 80 of gravity switch 10 and end 70 of rod 62. Gravity switch 10 has two operable positions. The first position of gravity switch 10 is an OFF position corresponding to the arrangement of component parts in FIGS. 1–3. The second position of gravity switch 10 is an ON position corresponding to the arrangement of component parts in FIG. 4.

With reference to FIGS. 2 and 3, selector portion 80 comprises two cooperating parts including a selector lever 90 and a locking lever 92. The two levers 90, 92 are arranged in a side-by-side relation being pivotally supported about a common axis of a pivot pin 94 fixedly projecting from bracket 84 towards side wall 24. Selector lever 90 is assembled outboard from locking lever 92 so as to be located further from side wall 24. An arm 96 of selector lever 90 extends in a forwardly direction to project through a slot 98 in a plate 100 which is rigidly connected to side wall 24. Plate 100 forms a right side margin of toaster oven 12 proximate hinged front door 16 in FIG. 1. An extreme end 102 of arm 96 is located beyond plate 100 external from toaster oven 12 and is suitably structured for support thereon of a finger-engageable knob, not shown. A fin-shaped projection 104 and a release cam tooth 106 are located along an upper edge 108 of selector lever 90 with fin projection 104 being situated froward (nearer to plate 100) in relation to cam tooth 106.

Locking lever 92 has a lock tooth 110 having a flat face surface 112. The assembled relation between lock tooth 110 and release cam tooth 106 locates flat face surface 112 of lock tooth 110 slightly behind release cam tooth 106 so that flat face surface 112 is exposed from the release cam tooth 106 as shown in FIG. 3. An arm 114 or locking lever 92 is off-set inwardly towards side wall 24 by two formed struts 116 most clearly shown in FIG. 4. Arm 114 vertically extends from struts 116 and is located in a plane nearer side wall 24 with respect to a plane of locking lever 92 at pivot 94. An elongated slot 118 is cut through arm 114 for close receipt of end 40 of pivotal bail 36 which is freely held therein by a known retainer means not shown. An ear 120 located at the top of arm 114, is formed in a direction extending away from side wall 24. A hole 122 extends through ear 120 for hook connection of one end 124 of a coil tension spring 126. A spring mounting stud 128 projects outwardly from side wall 24 and has the other end 130 of spring 126 attached thereon. As shown in FIGS. 2-4, spring 126 urges locking lever 92 in a clockwise direction about pivot pin 94. A pair of spaced apart ears 132, 134 on locking lever 92 are formed in overlapping relation with selector lever 90 near formed arm 96. The lowermost ear 134 is caused to engage selector lever 90 through continual urging from spring 126 which forms an interconnection between locking lever 92 and selector lever 90.

With continued reference to FIGS. 2 and 3, releasable latching device 82 of gravity switch 10 comprises, basically, three individual component members. The first member is a spring latch 136 fabricated from a thin sheet of resilient material, such as spring steel. Spring latch 136 is mounted in cantilever fashion to bracket 84 and extends in a direction towards plate 100. A tip 138 of spring latch 136 is bent formed in a latch-shaped configuration for catch relation with lock tooth 110. Spring latch 136 is pretensioned in a downwardly direction so that tip 138 is continually urged towards engagement with selector lever 90 and locking lever 92. A finger 140 of spring latch 136 projects towards side wall 24. Finger 140 is bent formed to project in an angularly upward direction.

The second member of releasable latching device 82 is also a flat spring 142 mounted to bracket 84 by rivet 144. Flat spring 142 extends in an opposite direction from spring latch 136. A free end 146 of spring 142 is blank stamped in a U-shape configuration.

Figure 6:
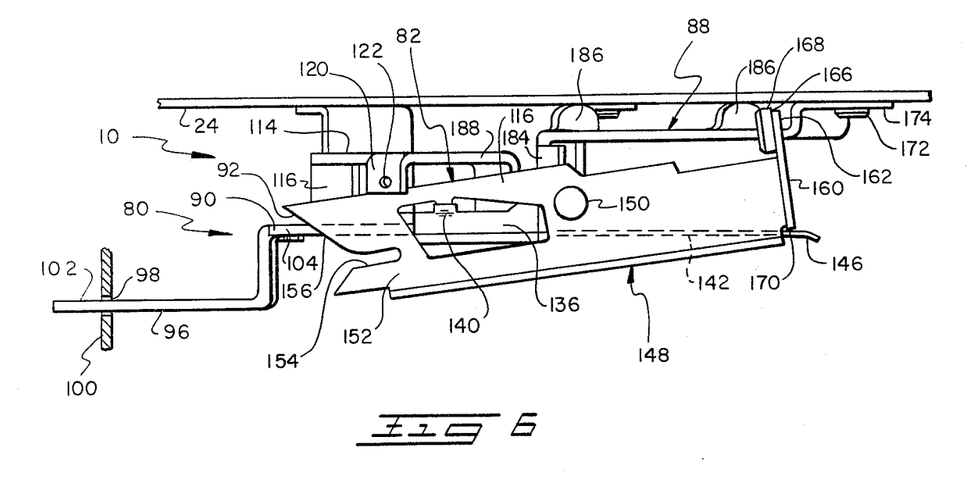
FIG. 6 is a top plan view showing the arrangement of component parts in the illustrated position of FIG. 5.

The third individual component part of releasable latching device 82 is a pivot arm 148 which is pivotally supported on bracket 84 by a pivot stud 150. A forward end 152 of pivot arm 148 has a slot 154 (FIG. 6) cut therein for receipt of fin projection 104 of selector lever 90. A side edge surface 156 angularly extends from slot 154 in a direction towards side wall 24. A projection 158 is located along pivot arm 148 intermediate pivot stud 150 and end 152 to project therefrom in a outwardly direction away from side wall 24 towards forward spring latch 136. Projection 158 has an overlapping engaged relation with finger 140. A rearward end 160 of pivot arm 148 is vertically formed upright having one end 162 (nearest side wall 24) supporting a fixed shoulder stud 164 that rotatably supports a wheel 166. A peripheral edge surface 168 of wheel 166 is located beyond end 162. An opposite end 170 of rearward end 160 is flat faced and located so as to be engaged under tension by end 146 of spring 142. In this manner, pivot arm 148 is continually biased in a counterclockwise direction (as viewed from the top in FIG. 6) about pivot stud 150.

Imbalanced weight member 88 is pivotally supported on a pivot stud 172 fixed on side wall 24 located above and slightly towards the rear in relation to hole 68 where end 70 of rod 62 extends therethrough. Imbalanced weight member 88 is a solid generally triangular-shaped part being pivotally supported about stud 172 at one corner 174. In this regard, a majority of solid mass of imbalanced weight member 88 is located to one side of pivot stud 172 (towards selector lever 90 and locking lever 92). A second corner 176 of imbalanced weight member 88 has a straight side edge surface 178 located proximate end 70 of rod 62. A third corner 180 of imbalanced weight member 88 includes a formed projection 182 extending outwardly away from side wall 24. Projection 182 is arcuately shaped, as viewed from the side in FIGS. 3–5, having a radial outer surface 184 in overlapping relation with arm 114 of locking lever 92. A pair of ears 186 are bent formed towards side wall 24. Ears 186 serve to stabilize imbalanced weight member 88 in a spaced relation away from side wall 24.

Operation of gravity switch 10 according to the present invention will now be described with reference being made to FIGS. 2-6. The configuration of component parts of gravity switch 10 when switch 10 is in the OFF position is best shown in FIGS. 2 and 3. In the OFF position, locking lever 92 is continually being urged in a clockwise direction about pivot pin 94 under tension supplied from connected spring 126. Ear 134 of locking lever 92 engageably supports selector lever 90. Levers 90,92 are pivotally limited by fin projection 104 being bottomed with slot 154 of pivot arm 148. End 40 of pivot bail 36 resting in slot 118 of arm 114 is orientated to position its opposite end 38 in a de-energized relation with the electrical switch contained in electrical circuitry box 34 which effectively blocks flow of current to heating elements 32. Tip 138 of spring latch 136 engageably bears on selector lever 90 and locking lever 92 at a location just forward from release cam tooth 106 and locking tooth 110. Imbalanced weight member 88 is supported against the pull of gravity by arcuate surface 184 of formed projection 182 in engagement with a side edge surface 188 of arm 114 of locking lever 92. In the supported position of FIGS. 2 and 3, straight edge surface 178 is spaced away from contact with end 70 of rod 62. A face surface 190 of imbalanced weight member is aligned for contact with peripheral edge 168 of wheel 166 as discussed below. Peripheral edge 168 of wheel 166 is held away from contact with front face surface 190 by fin projection 104 resting within slot 154 thereby holding pivot arm 148 against urging from end 146 of spring 142.

To initiate a toasting cycle operation of toaster oven 12, gravity switch 10 is moved from the OFF position of FIGS. 2 and 3 to an ON position corresponding to the arrangement of parts in FIG. 4. In FIG. 4, the original OFF position of a portion of selector lever 90 in indicated by broken lines 192. Selector lever 90 is manually pivoted about pivot pin 94 from the OFF position (broken lines 192) to the illustrated solid position. This is comfortably accomplished by applying downwardly pressure on a suitably contoured knob (not shown) mounted on end 102 of arm 96 external from plate 100. Downward pivotal movement of selector lever 90 jointly pivots locking lever 92 because of the overlapping connection between ear 134 of locking lever 92 engaging selector lever 90. Accordingly, both levers 90, 92 are pivoted together in a counterclockwise direction about pivot pin 94 against the pull from helical tension spring 126.

As a result of levers 90, 92 being pivoted from the OFF position (FIG. 3) to the ON position (FIG. 4), fin projection 104 is moved external from slot 154. This frees pivot arm 148 to pivot counterclockwise about pivot stud 150 urged by tension supplied by end 146 of spring 142 until coming to rest with peripheral edge 168 of wheel 166 in contact with face surface 190 of imbalanced weight member 88. As shown in FIG. 4, side edge surface 188 of locking lever 92 is pivoted away from engagement with arcuate surface 184 of formed projection 182 on imbalanced weight member 88. Consequently, imbalanced weight member 88 is allowed to pivot under the pull of gravity, from its supported position of FIG. 3, in a counterclockwise direction about pivot stud 172. Imbalanced weight member 88 is stopped in a second supported position wherein straight edge surface 178 engageably bearing on end 70 of extension rod 62 as illustrated in FIG. 4.

During selective pivoting of levers 90, 92 from the OFF towards the ON position, tip 138 is caused to ride along the contour of lock tooth 110 until flat face surface 112 is brought forwardly from tip 138 which allows it to spring downwardly into alignment with flat face surface 112. Upon release of finger pressure from selector lever 90, spring 126 urges the locking lever 92 in a clockwise direction thereby bringing flat face surface 112 into latching relation with tip 138 as illustrated in FIG. 4 corresponding to the ON position of gravity switch 10.

In the arrangement of parts of FIG. 4, peripheral edge 168 of wheel 166 bears against face surface 190 of imbalanced weight member 88 at a location near a top edge surface 194 connecting corner 172 to corner 180. Additionally, end 40 of pivot bail 36 is moved forwardly to the solid line location from the original OFF position illustrated by dashed lines 195 in FIG. 4. Movement of end 40 causes pivot bail 36 to pivot in a clockwise direction about recesses 42. This motion transmits corresponding motion to occur at the other end 38 of pivot bail 36 which is motion utilized to actuate the electrical switch contained in electrical circuitry box 34. Accordingly, flow of electrical current is allowed to continually pass through heating elements 32 while the electrical switch remains actuated. The energized heating elements 32 give rise to the temperature within oven chamber 20 so as to toast articles such as, a slice of bread. This increasing temperature change causes internal stress action to occur within metal blades 48, 50 of strip 46 of thermosensitive device 44 which, in turn, causes strip 46 to deform in a manner displacing free end 58 away from side wall 24 towards ear 76 of bracket 72 in FIG. 2. Extension rod 62 is pulled with the displacing free end 58 causing end 70 to slidingly rub against straight edge surface 178 of imbalanced weight member 88. This sliding action is resisted only slightly by the weight from imbalanced weight member 88 bearing on end 58. In order to minimize sliding friction between end 58 and straight edge surface 178, a piece of plastic material 196 is taped so as to cover corner 176 about straight edge surface 178.

When oven chamber 20 reaches a discrete temperature e.g., corresponding to when the slice of bread is properly browned according to a selectable setting of adjustable mechanism 56, end 70 of rod 62 is correspondingly displaced to be concurrently removed from engagement with straight edge surface 178. Release of imbalanced weight member 88 from engagement with end 70 initiates a series of interacting events among component parts of gravity switch 10. These events occur rapidly in a snap fashion so as to automatically return gravity switch 10 from the ON position to the OFF position thereby quickly terminating the toasting cycle as described below. Gravitational pull causes imbalanced weight member 88 to pivot in a counterclockwise direction about pivot stud 172 from the supported position of FIG. 4 to an actuated position shown in FIG. 5. A ledge 198 below corner 180 on imbalanced weight member 88 is aligned to come into contact with a top edge surface 200 of bracket 84 to stop pivotal motion of imbalanced weight member 88 in the actuated position, as is occuring in FIG. 5. During gravitational pivot motion of imbalanced weight member 88, peripheral edge 168 is removed from engagement with front face surface 190, thus enabling pivot arm 148 to pivot under tension supplied from end 146 of flat spring 142 in bearing on end 170. As best shown in the top view of FIG. 6, pivot arm 148 is caused to pivot in a counterclockwise direction about pivot stud 150 which locates side edge surface 156, near slot 154, above fin projection 104.

Concurrently with the above-described pivoting motion of pivot arm 148, formed projection 158 sliding engages with finger 140 of spring latch 136. The complimentary angular relation between formed projection 158 and finger 140 causes a camming action to occur therebetween. This camming action bends spring latch 136 upwardly to elevate tip 138 out of engagement with flat face surface 112 of lock tooth 110 thereby releasing locking lever 92. As a result, tension stored within extended spring 126 causes locking lever 92 to pivot in a clockwise direction about pivot pin 94 from the position in FIG. 4 toward the position of FIG. 3. Selector lever 90 is pivotally driven with locking lever 92 through its engagement with ear 134.

During returning pivot motion of levers 90, 92, pivot arm 148 and imbalanced weight member 88 are restored to the OFF position in FIG. 3. To accomplish this, pivot arm 148 is caused to pivot in a clockwise direction (as viewed in FIG. 6) about pivot stud 150 against tension from end 146 of spring 142 when fin projection 104 is brought into sliding engagement with angular side edge surface 156 of pivot arm 148. The pull supplied from spring 126 is sufficient to overcome the tension from end 146 of spring 142. Pivot arm 148 is pivotally driven until slot 154 is aligned for receipt of fin projection 104 from angular side edge surface 156. Imbalanced weight member 88 is caused to pivot in a clockwise direction (as viewed in FIG. 5) about pivot stud 172 against the pull of gravity coincident with the above-described pivoting motion of pivot arm 148. This is accomplished because side edge surface 188 of locking lever 92 is brought into contact with radial outer surface 184 of imbalanced weight member 88 at a location above pivot stud 172 so as to effectively pivot imbalanced weight member 88 in the prescribed direction. The angularly sliding relation between radial outer surface 184 and side edge surface 188 insures smooth pivotal movement of imbalanced weight member 88 from the position of FIG. 5 towards the position of FIG. 3. In the position of FIG. 3, straight edge surface 178 is located forwardly from hole 68 so as to permit full return of end 70 in response to oven chamber 20 seeking room temperature. Bail 36 is caused to pivot in a counterclockwise direction about recess 42 by end 40 being driven by slot 98 of returning locking lever 92. This pivoting motion of bail 36 is sufficient so as to cause the electrical switch in electrical circuitry box 34 to discontinue flow of current through heating elements 32 thereby ending the heating process within oven chamber 20. With the heating elements 32 de-energized, oven chamber 20 is allowed to cool causing strip 46 to return to the relaxed position. Accordingly, with the above-described interaction among component parts in returning gravity switch 10 from the ON position of FIG. 4 to the OFF position of FIG. 3, the toasting cycle operation of toaster 12 is completed and readied for a subsequent operation.

In the event one wishes to terminate the toasting cycle operation prior to completion of the heating process applicant provides a manual override feature that enables one to selectively move the gravity switch 10 from the ON position to the OFF position. To accomplish manual "shut-off" one merely applies upward force on the knob (not shown) connected to end 102 of arm 96 of selector lever 90. By this action, selector lever 90 is caused to pivot in the clockwise direction about pivot pin 94 moving selector lever 90 away from engagement with ear 134. During initial movement of selector lever 90, locking lever 92 remains stationary by being held through engagement between tip 138 and locking tooth 110. Further movement of selector lever 90 brings release cam tooth 106 into sliding engagement with tip 138 causing it to move upwardly out of engagement with locking tooth 110. When this occurs, tension from spring 126 is allowed to return pivot locking lever 92 bringing ear 134 into engagement with selector lever 90 and effectively causing the previously described interaction among component parts of gravity switch 10 to terminate the toasting cycle operation.

While the above-described embodiment of the invention is satisfactory in many respects, an unexpected problem occured during mass production and during a testing program of gravity switch 10 built according to FIGS. 1-16. it was discovered that imbalanced weight member 88 failed, in some instances, to properly pivot under the pull of gravity when released from engagement with end 70 after rod 62 is moved to the displaced position. This hang up problem of imbalanced weight member 88 is attributed to many variable factors including accumulation of part tolerances which initially causes imbalanced weight member 88 to bind either at pivot 172 or as a result of binding pressure from flat spring 142 causing wheel 166 on pivot arm 148 to bear on surface 190. Additionally, some test units were observed experiencing this hang up failure after many successful operations. These test failures are attributed to environmental variables, such as moisture or heat changes which, after a period of time, effect proper functioning of gravity switch 10. These kind of variables are difficult to avoid on a mass production, worldwide bases and particularly in view of using gravity switch 10 in a household appliance such as toaster oven 12. As a sensitivity gage, the aforementioned problem has been observed to occur on approximately 15%-25% of units built thus far which is felt significant enough to warrent implementation of a quick economical solution.

Figure 7:
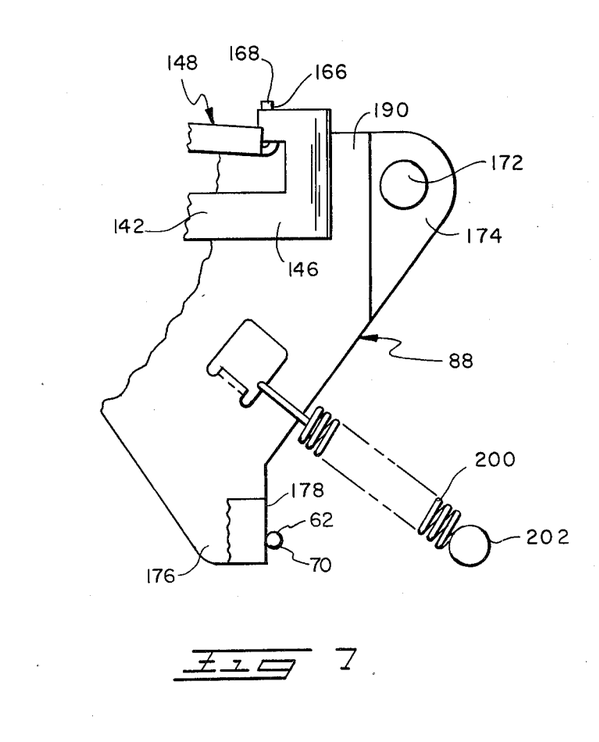
FIG. 7 is a partial side elevational view showing an improved modification applied to the imbalanced weight member as intended for a production unit of the gravity switch according to FIGS. 1–6.

Accordingly, applicant provides a modification, as shown in FIG. 7, which significantly improves reliability making gravity switch 10 less sensitive to factors leading towards hang up of imbalanced weight member 88. In the improved modification of FIG. 7, a spring 200 is added to extend in a direction substantially in line with pivoting motion of imbalanced weight member 88. Spring 200 is connected to imbalanced weight member 88 and extends therefrom to a spring mount 202 projecting outwardly from side wall 24. Spring 200 is slightly tensioned when imbalanced weight member 88 is supported by end 70 of rod 66. It should be understood that spring 200 only becomes functionally necessary in the event when conditions casing hang up are present. In this regard, after imbalanced weight member 88 is free, spring 200 serves as an aid to gravitational force pivoting imbalanced weight member 88.

Applicant recognizes that other solutions for overcoming hang up of imbalanced weight member 88 are possible. For example, the configuration of imbalanced weight member 88 may be changed from the disclosed shape or additional weight added so as to effectively increase the imbalanced distribution of weight about pivot 172. Another way of reducing the sensitivity of imbalanced weight member 88 is to provide an easily adjustable means for controlling tension from flat spring 142 so as to avoid binding pressure exerted therefrom.

It is therefore seen that the present invention provides a simple gravity switch containing relatively inexpensive mechanically operable parts whose operation is governed by a gravity operated member for automatic control of an operation cycle in an appliance.

In the drawing and specification, there has been set forth a preferred embodiment of the invention and, although specific terms are employed, these are used in a descriptive sense only and not for purposes of limitation. Changes in form and the proportion of parts as well as substitution of equivalents are contemplated as circumstance may suggest or render expedient without departing from the spirit or scope of this invention as defined in the following claims.

I claim:

1. A gravity switch for use in an appliance having means displaceable between a normal relaxed position and a displaced position, the switch being operable between an OFF position for locating the displaceable means in the relaxed position and an ON position for enabling the displaceable means to move from the relaxed position to the displaced position, the switch comprising:
(A) structure means fixed in the appliance for supporting the switch;
(B) selector means movably mounted on said structure means and being manually movable from the OFF position to the ON position;
(C) releasable latching means operable for holding said selector means in the ON position;
(D) restoring means operable with said releasable latching means for automatically returning said selector means from the ON position to the OFF position; and
(E) an imbalanced weight member pivotally mounted and having a majority of mass located to one side of the pivot mount, said imbalanced weight member being operable in a first position wherein said selector means in the OFF position supports said imbalanced weight member against the pull of gravity, a second position wherein the displaceable means supports said imbalanced weight member against the pull of gravity with said selector means in the ON position and a third position wherein said imbalanced weight member actuating said restoring means to initiate return of said selector means from the ON position towards the OFF position, and said imbalanced weight member being pivoted from said first position towards said second position and from said second position towards said third position under the pull of gravity.

2. The gravity switch according to claim 1 wherein said restoring means comprises:
an arm member pivotally supported on said structure means;
coupling means operatively connecting said arm member to said releasable latching means;
a first biasing means for urging said arm member towards engagement with said imbalanced member; and
a second biasing means connected to said selector means for urging said selector means towards the OFF position.

3. The gravity switch according to claim 2 wherein said releasable latching means includes a resilient latch urged towards said selector means and said coupling means includes a working portion on said arm member engaged with said resilient latch for operatively moving said resilient latch out of holding relation with said selector means.

4. The gravity switch according to claim 3 wherein said arm member being pivotable between at least two positions including a tensioned position wherein said arm member engages said imbalanced weight member through urging from said first biasing means and an actuated position wherein said arm member being released from engagement with said imbalanced weight member, said arm member pivots between said tensioned position and said actuated position to cause said working portion of said arm member to operatively move said resilient latch.

5. The gravity switch according to claim 2 wherein said second biasing means comprises a coil tension spring.

6. The gravity switch according to claim 1 wherein said structure means comprises a bracket and said selector means comprises a pair of levers pivotally mounted on said bracket and said pair of levers are coupled together for pivotal movement about a common axis.

7. The gravity switch according to claim 6 wherein said pair of levers comprises a first lever having an arm extending external from the appliance for enabling manual manipulation.

8. The gravity switch according to claim 7 wherein said pair of levers further comprises a second lever operatively coupled to said first lever and cooperable with said releasable latch means.

9. The gravity switch according to claim 8 wherein said first lever pivotally drives said second lever when said first lever is manually pivoted from the OFF position towards the ON position and said second lever pivotally drives said first lever when said second lever is returning from the ON position towards the OFF position.

10. The gravity switch according to claim 9 wherein said second lever has a tooth formed thereon, said tooth being brought into latch relation with said releasable latching means in response to said first lever being pivoted from the OFF position to the ON position.

11. The gravity switch according to claim 10 wherein said first lever has a release tooth configuration thereon, said release tooth being cooperable with said releasable latching means and said first lever being manually movable from the ON position towards the OFF position for causing said release tooth to engageably release the hold of said releasable latching means with said tooth on said second lever.

12. The gravity switch according to claim 1 wherein the appliance is an electrically powered toaster oven having a side wall forming a portion of an oven chamber and at least one heating element electrically coupled to a current flow control means for heating said oven chamber when current is supplied to said one heating element, said displaceable means comprises a heat sensor located proximate said oven chamber, said heat sensor being in the form of a deformable strip made from material capable of being resiliently deformed in a predeterminable manner in response to temperature changes within said oven chamber, and means operatively coupling the gravity switch to said current flow control means and when the gravity switch in the OFF position, current flow is prevented from entering said one heating element and when the gravity switch in the ON position, current flow is allowed to enter said one heating element thereby heating said oven chamber.

13. The gravity switch according to claim 12 wherein the gravity switch is assembled on said side wall external from said oven chamber.

14. The gravity switch according to claim 12 wherein said heat sensor strip has one end fixed in relation to said side wall with the other end being free to move away from and towards said side wall according to said heat sensor strip being deformed due to temperature changes within said oven chamber.

15. The gravity switch according to claim 14 wherein said free end of said heat sensor strip carries a extension member movable therewith and extending therefrom towards operative relation with said imbalanced weight member.

16. The gravity switch according to claim 15 wherein the gravity switch being moved from the OFF position to the ON position causes said imbalanced weight member to supportably engage said extension member of said heat sensor strip.

17. The gravity switch according to claim 16 wherein heating of said oven chamber causes said heat sensor strip to deform in a manner moving said free end from the relaxed position away from said side wall towards the displaced position and upon said free end reaching the displaced position, said imbalanced weight member being released from support engagement with said extension member.

* * * * *